Sept 8, 1925.
J. R. GAMMETER
METHOD AND APPARATUS FOR MOLDING HOLLOW ARTICLES
Filed Aug. 2, 1922
1,553,154
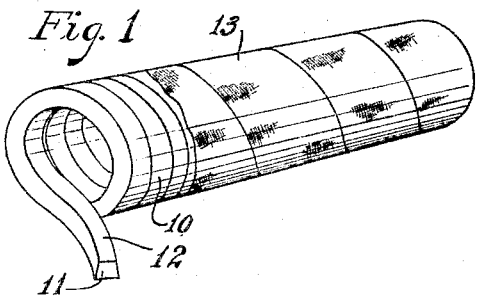
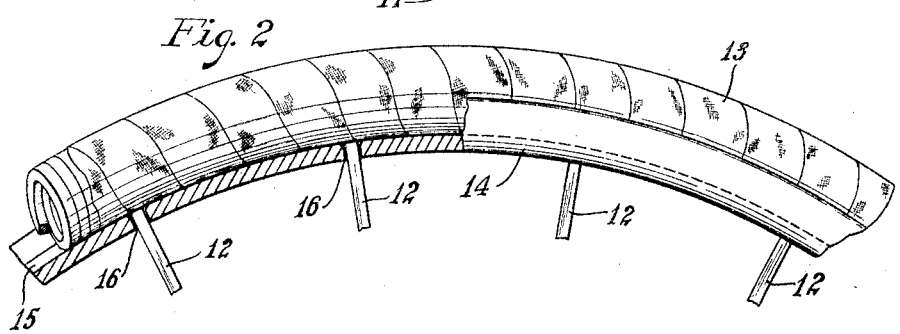
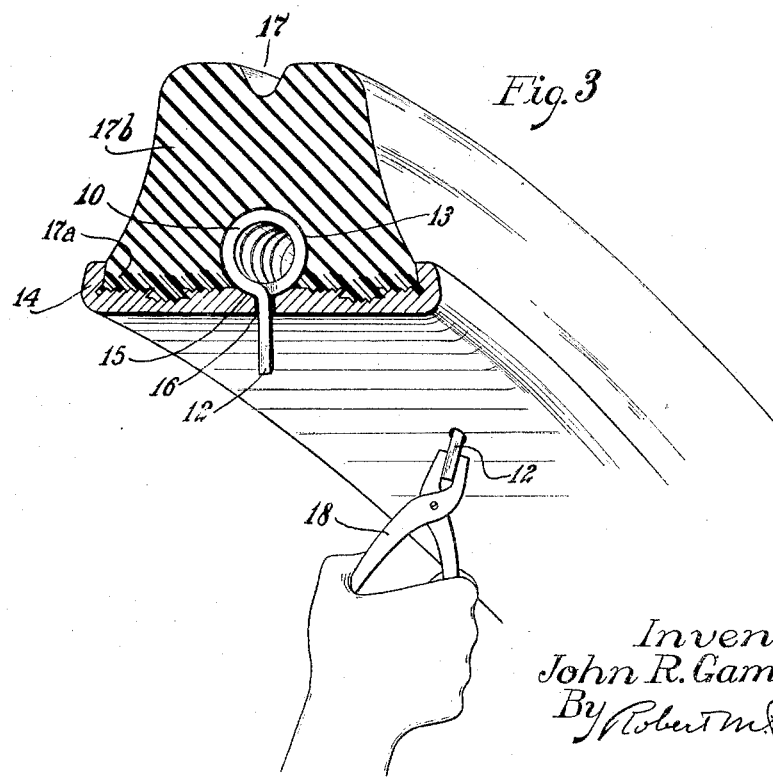
Inventor
John R. Gammeter.
By Robert M. Pierson
Atty.

Patented Sept. 8, 1925.

1,553,154

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR MOLDING HOLLOW ARTICLES.

Application filed August 2, 1922. Serial No. 579,098.

*To all whom it may concern:*

Be it known that I, JOHN R. GAMMETER, a citizen of the United States, residing at Akron, in the county of Summit and State of Ohio, have invented a certain new and useful Method and Apparatus for Molding Hollow Articles, of which the following is a specification.

This invention relates to the manufacture of molded articles, and is particularly applicable to the manufacture of cushion tires where a rubber tire body, vulcanized on a metal base, is formed with a circumferential cavity adjacent the base, and the vulcanizing core used to form the cavity requires to be removed from the tire body, through the base, after vulcanization of the tire.

My chief objects are to provide an improved method of forming an internal cavity in a molded article, and in the case of a cushion tire vulcanized on a metal base, to do so with a minimum alteration of the standard solid tire base, and to provide improved apparatus for forming cavities in such articles as they are molded or vulcanized.

Of the accompanying drawings:

Fig. 1 is a perspective view of a single section of a preferred form of core embodying and adapted to carry out my invention, with the fabric cover partly broken away.

Fig. 2 is a side elevation, partly in section and with parts broken away, of a tire base and a series of my improved core sections assembled thereon.

Fig. 3 is a sectional perspective view of a vulcanized tire showing the relation of the core sections thereto, and illustrating a method of removing the core sections.

Referring to the drawings, 10 is a section of the core, which is preferably formed by wrapping a wire 11 on a straight cylindrical mandrel in a series of adjacent helical convolutions. The wire 11 is of a soft metal, such as lead, or an alloy whose principal constituent is lead, and before winding it preferably has, in cross-section, the form of a trapezoid as indicated in Fig. 1. It is wrapped with its wider parallel face outermost, so that in bending around the greater circumference said wide face is stretched and thereby narrowed until it has substantially the same width as the opposite or internal face, resulting in a compact, tubular structure, presenting a smooth external surface.

At one end of each core section, as it is wound, the wire is cut so as to leave a short straight end piece or stem 12 projecting from the wound section, which end piece is bent to project radially from the core section. At the opposite end of each core section the wire 11 terminates at a point in its convolution substantially aligned with the point at which the end portion 12 is turned radially outward, so that when assembled in a series the several sections present a substantially uninterrupted external surface.

A suitable number of the core sections being prepared as described, and the supports upon which they are wound removed, they are then assembled, end to end, with their projecting ends 12 in alignment, and secured together by means of a tape wrapping 13.

The set of wrapped core sections 10 is then assembled with a base 14 upon which the tire is to be built, said base being formed with a shallow circumferential groove 15 along the median line of its outer periphery, and a plurality of equi-distant apertures 16, 16 traversing the base within said groove, said apertures being adapted to receive the radial end portions 12 of the wires 11, which portions 12 are successively mounted in their apertures 16, projecting through the latter, as the set of core sections is bent about the tire base. When the tire base has thus been completely encircled, the ends of the composite core abutting each other, said ends are secured in place by means of additional tape. The flexibility of the coiled wire core makes the assembling operation comparatively easy, the wrapping tape being stretchable enough to compensate for the increased diameter at the outer periphery of the core, and the tape serves to prevent rubber from entering between the convolutions of the core during the molding and vulcanizing of the tire.

A tire body 17 preferably comprising a layer of hard rubber compound 17$^a$ next to the metal base and a body of cushion rubber 17$^b$ thereon (as shown in Fig. 3), is then built upon the base and core in any suitable manner, after which the resulting structure is placed in a suitable mold, adapted to accommodate the inwardly projecting wire ends, 12, and vulcanized under mold pressure as in the usual practice.

When the vulcanization is complete, the tire is removed from its mold, and the core sections are withdrawn from the tire through the apertures 16 by manually gripping and pulling the projecting wires 12 with a suitable tool, such as the pincers shown at 18 in Fig. 3, the soft wire readily uncoiling and following endwise through the aperture, leaving the wrapping tape adhering to the wall of the cavity within the tire.

Modifications may be resorted to without departing from the scope of my invention and I do not limit my claims wholly to the specific construction shown, nor to the exact procedure described.

I claim:

1. The method of making hollow cushion tires which comprises assembling an arcuate wire helix with a base to which the tire is to be vulcanized, said helix acting as a core, building the tire over the core on said base, vulcanizing the tire to the base and pulling said wire endwise to uncoil it and withdraw it from the tire.

2. The method of making hollow cushion tires which comprises assembling on a base to which the tire is to be vulcanized, a circumferential series of helically coiled wire core-sections having their ends projecting through a circumferentially spaced series of apertures in the base, building the tire over the core sections on said base, vulcanizing said tire, and pulling the wires endwise out of the tire through said apertures.

3. The method of making hollow cushion tires which comprises wrapping with tape a circumferential series of helically coiled wire core-sections each with one of its ends projecting therefrom, to form a core, assembling said core on a tire-base with said ends projecting through apertures therein building the tire over the core on said base, vulcanizing said tire, and then removing the core sections through the respective apertures without removing their tape wrapping.

4. A vulcanizing core comprising an annular series of helical sections of lead wire having projecting stems.

5. Apparatus for making hollow articles, said apparatus comprising a coil of wire forming a core, a woven fabric covering on said core, the wire of said core being adapted to be uncoiled and removed from said covering by a pull upon its end portion, leaving the covering in said article.

6. Apparatus for molding an annular cavity in an article, said apparatus comprising an annular series of abutting, coiled-wire, core sections, the wire of each of said sections being adapted to be withdrawn endwise from said articles through a transversely disposed aperture therein.

7. Apparatus for making a hollow cushion tire body, said apparatus comprising an annular, perforated metal base adapted to support said tire body, and a core member comprising a wire helix, the wire of said helix being withdrawable endwise through a perforation of said base.

8. Apparatus for making a hollow cushion tire body, said apparatus comprising a metal base adapted to support a tire body and provided with a plurality of circumferentially disposed apertures, and a circumferential series of wire helices forming a core, each unit of the series having one of its ends projecting through an aperture of said base.

9. Apparatus for making hollow cushion tires comprising an annular, perforated, metal base adapted to support said tire, a core member comprising a helix of wire, said wire being substantially rectangular in cross-section and withdrawable endwise through a perforation of said base, and a fabric wrapping on said wire helix.

10. Apparatus for making a hollow cushion tire body, said apparatus comprising a perforated metal base adapted to support a tire body, a core comprising a plurality of adjacent wire helices, the wire of said helices being withdrawable endwise through the perforations in said base, and a fabric wraping common to said helices.

11. Apparatus for making hollow cushion tires comprising an annular, perforated, metal base adapted to support said tire, and a core member comprising a helix of wire said wire being substantially rectangular in cross-section and withdrawable endwise through a perforation of said base.

In witness whereof I have hereunto set my hand this 25 day of July, 1922.

JOHN R. GAMMETER.